(12) United States Patent
Cheung et al.

(10) Patent No.: US 10,404,928 B2
(45) Date of Patent: Sep. 3, 2019

(54) IMAGE SENSOR AND A METHOD OF OPERATING THE SAME

(71) Applicant: Himax Imaging Limited, Tainan (TW)

(72) Inventors: Yu Hin Desmond Cheung, Tainan (TW); Amit Mittra, Tainan (TW); Yang Wu, Tainan (TW)

(73) Assignee: Himax Imaging Limited, Tainan (TW)

( * ) Notice: Subject to any disclaimer, the term of this patent is extended or adjusted under 35 U.S.C. 154(b) by 175 days.

(21) Appl. No.: 15/642,927

(22) Filed: Jul. 6, 2017

(65) Prior Publication Data

US 2019/0014276 A1    Jan. 10, 2019

(51) Int. Cl.
| | |
|---|---|
| H04N 5/359 | (2011.01) |
| H04N 5/378 | (2011.01) |
| H04N 5/353 | (2011.01) |
| H04N 5/357 | (2011.01) |
| H04N 5/355 | (2011.01) |
| H04N 5/3745 | (2011.01) |

(52) U.S. Cl.
CPC ......... *H04N 5/3591* (2013.01); *H04N 5/3535* (2013.01); *H04N 5/3575* (2013.01); *H04N 5/35554* (2013.01); *H04N 5/35563* (2013.01); *H04N 5/378* (2013.01); *H04N 5/37457* (2013.01)

(58) Field of Classification Search
CPC ............. H04N 5/3535; H04N 5/35536; H04N 5/35545; H04N 5/35554; H04N 5/35563; H04N 5/3575; H04N 5/3591; H04N 5/37457; H04N 5/378
See application file for complete search history.

(56) References Cited

U.S. PATENT DOCUMENTS

| | | | | |
|---|---|---|---|---|
| 7,489,352 | B2 * | 2/2009 | Nakamura | H04N 5/35554 348/216.1 |
| 7,825,966 | B2 * | 11/2010 | Manabe | H04N 5/2355 348/248 |
| 8,890,991 | B2 * | 11/2014 | Sekine | H04N 5/343 348/302 |
| 2008/0036888 | A1 * | 2/2008 | Sugawa | H04N 5/2355 348/294 |
| 2008/0251691 | A1 * | 10/2008 | Adachi | H01L 27/14609 250/206 |
| 2010/0188541 | A1 * | 7/2010 | Mabuchi | H01L 27/14656 348/302 |
| 2013/0256510 | A1 * | 10/2013 | Lyu | H01L 27/14612 250/208.1 |
| 2017/0126997 | A1 * | 5/2017 | Ha | H04N 5/3591 |
| 2017/0347047 | A1 * | 11/2017 | Mao | H01L 27/14612 |
| 2017/0350755 | A1 * | 12/2017 | Geurts | G01J 1/4228 |

* cited by examiner

*Primary Examiner* — Daniel M Pasiewicz
(74) *Attorney, Agent, or Firm* — Donald E. Stout; Stout, Uxa & Buyan, LLP

(57) ABSTRACT

The invention is directed to a method of operating an image sensor. A first integration is performed on a first photodiode of a pixel circuit to obtain at least one first image signal. A second integration is performed on a second photodiode of the pixel circuit to obtain a second image signal, the first photodiode having a photodiode area larger than the second photodiode. A third integration is performed by collecting blooming charge overflowing from the first photodiode to obtain an overflow image signal. The first integration has longest integration time and the third integration has shortest integration time among the first integration, the second integration and the third integration.

20 Claims, 7 Drawing Sheets

IMAGE SENSOR AND A METHOD OF OPERATING THE SAME

BACKGROUND OF THE INVENTION

1. Field of the Invention

The present invention generally relates to an image sensor, and more particularly to a method of operating an image sensor with high dynamic range.

2. Description of Related Art

A complementary metal-oxide-semiconductor (CMOS) image sensor has been widely applied to mobile applications. The CMOS image sensor may be applied to other applications such as automotive and security applications. Requirements for the automotive and security applications are quite different from that for the mobile applications. For example, one strong request is high dynamic range (HDR), with which ultra dim and bright scenes can be captured at the same frame and with good quality.

Dynamic range of pixel can be extended by splitting a single pixel into two photodiodes, one small and one large. Nevertheless, unwanted motion artifacts are present as the integration time of the long exposure and short exposure do not overlap.

Light-emitting diode (LED) lights used in traffic signals and automotive brake lights are typically modulated at 90 Hz or above. When integration time of a particularly photodiode in a pixel is shorter than the ON duty cycle of the LED, the pixel will sometimes miss the LED signal, resulting in flickering of the LED.

For the foregoing reasons, a need has arisen to propose a novel image sensor and a method thereof in order to overcome drawbacks of the conventional image sensors.

SUMMARY OF THE INVENTION

In view of the foregoing, it is an object of the embodiment of the present invention to provide a method of operating an image sensor with high dynamic range without motion artifacts. The embodiment is capable of capturing high contrast scenes without saturation. The embodiment is capable of reducing cost of implementing, for example, 120 dB dynamic range by reading out at least three exposure values using two photodiodes in a pixel. The embodiment is also capable of mitigating LED flickering.

According to one embodiment, a method of operating an image sensor includes performing a first integration on a first photodiode of a pixel circuit to obtain at least one first image signal; performing a second integration on a second photodiode of the pixel circuit to obtain a second image signal, the first photodiode having a photodiode area larger than the second photodiode; and performing a third integration by collecting blooming charge overflowing from the first photodiode to obtain an overflow image signal. The first integration has longest integration time and the third integration has shortest integration time among the first integration, the second integration and the third integration.

According to another embodiment, a method of operating an image sensor includes resetting a first photodiode of a pixel circuit and then beginning a first integration on the first photodiode; resetting a second photodiode of the pixel circuit and then beginning a second integration on the second photodiode, the first photodiode having a photodiode area larger than the second photodiode; performing a third integration by collecting blooming charge overflowing from the first photodiode, the first integration has longest integration time and the third integration has shortest integration time among the first integration, the second integration and the third integration; at an end of the third integration, reading out an overflow image signal; reading out an overflow reset signal for the third integration, the overflow reset signal being used as a second reset signal related to the second photodiode; reading out a second image signal related to the second photodiode after an end of the second integration; and reading out at least one first reset signal related to the first photodiode before an end of the first integration, and then reading out at least one first image signal related to the first photodiode after an end of the first integration.

According to a further embodiment, an image sensor includes a plurality of pixel circuits each including a first photodiode, a second photodiode, a first transfer transistor, a second transfer transistor, a connect transistor, a reset transistor, a source follower and a select transistor. The first photodiode has a photodiode area larger than the second photodiode. The first transfer transistor is connected between the first photodiode and a first floating diffusion (FD) node. The second transfer transistor is connected between the second photodiode and a second FD node. The connect transistor is connected between the first FD node and the second FD node. The reset transistor is connected between a power voltage and the second FD node. The source follower and the select transistor are connected in series between the power voltage and an output node, the source follower being connected between the power voltage and the select transistor and a gate of the source follower being connected to the first FD node, the select transistor being connected between the source follower and the output node. A first integration is performed on the first photodiode to obtain at least one first image signal; a second integration is performed on the second photodiode to obtain a second image signal; and a third integration is performed by collecting blooming charge overflowing from the first photodiode to obtain an overflow image signal. The first integration has longest integration time and the third integration has shortest integration time among the first integration, the second integration and the third integration.

DETAILED DESCRIPTION OF THE INVENTION

Figure 1:
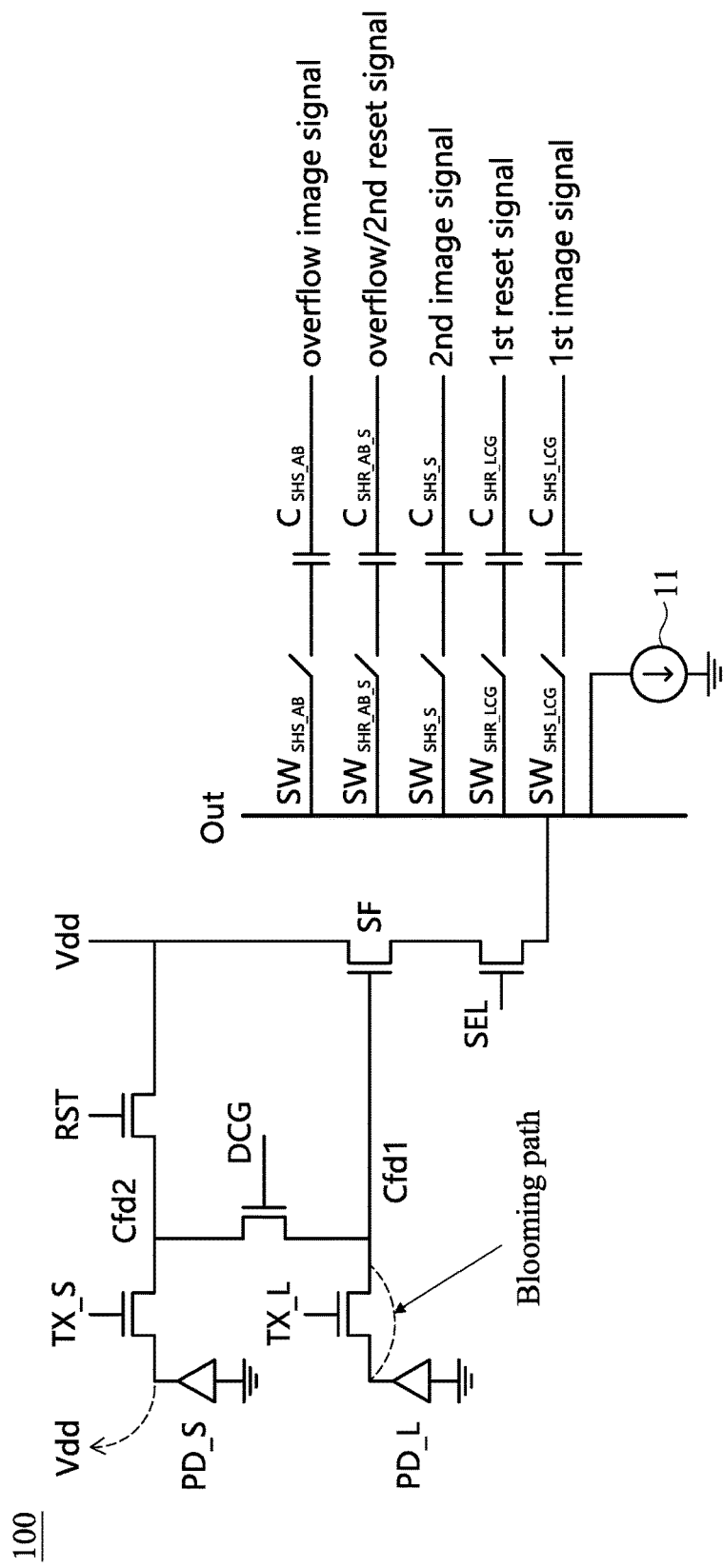
FIG. 1 shows a circuit diagram illustrated of a pixel circuit of an image sensor according to a first embodiment of the present invention.

FIG. 1 shows a circuit diagram illustrated of a pixel circuit 100 of an image sensor (e.g., a complementary metal-oxide-semiconductor (CMOS) image sensor) according to a first embodiment of the present invention. The pixel circuit 100 of the embodiment adopts four-transistor (4T) pixel architecture.

In the embodiment, the pixel circuit 100 may include a large (or first) photodiode PD_L and a small (or second) photodiode PD_S. The large photodiode PD_L has a photodiode area larger than the small photodiode PD_S. The anodes of the large photodiode PD_L and the small photodiode PD_S are connected to ground. Details of splitting a photodiode into a large photodiode and a small photodiode may be referred to "A 1280×1080 4.2 μm Split-diode Pixel HDR Sensor in 110 nm BSI CMOS Process," entitled to Trygve Willassen et al., the disclosure of which is incorporated herein by reference.

The pixel circuit 100 may include a first transfer transistor TX_L connected between (a cathode of) the large photodiode PD_L and a first floating diffusion (FD) node Cfd1, and a second transfer transistor TX_S connected between (a cathode of) the small photodiode PD_S and a second FD node Cfd2. As shown in FIG. 1, (gates of) the first transfer transistor TX_L and the second transfer transistor TX_S are controlled by associated signals TX_L and TX_S, respectively.

The pixel circuit 100 may include a connect transistor DCG that is connected between the first FD node Cfd1 and the second FD node Cfd2. As shown in FIG. 1, (a gate of) the connect transistor DCG is controlled by an associated signal DCG. The pixel circuit 100 may include a reset transistor RST connected between a power voltage Vdd and the second FD node Cfd2. As shown in FIG. 1, (a gate of) the reset transistor RST is controlled by an associated signal RST.

The pixel circuit 100 may include a source follower transistor (usually abbreviated as source follower) SF and a select transistor SEL connected in series between the power voltage Vdd and an output node (or bit line). Specifically, the source follower SF is connected between the power voltage Vdd and the select transistor SEL, and a gate of the source follower SF is connected to the first FD node Cfd1. The select transistor SEL is connected between the source follower SF and the output node with a gate controlled by an associated signal SEL.

The pixel circuit 100 may include a current source 11, coupled between the output node and ground, which is used as a biasing circuit configured to sink a current from the output node. The pixel circuit 100 may include a plurality of switches (e.g., $SW_{SHS\_AB}$, $SW_{SHR\_AB\_S}$, $SW_{SHS\_S}$, $SW_{SHR\_LCG}$ and $SW_{SHS\_LCG}$) connected to the output node respectively. The pixel circuit 100 may include a plurality of capacitors (e.g., $C_{SHS\_AB}$, $C_{SHR\_AB\_S}$, $C_{SHS\_S}$, $C_{SHR\_LCG}$ and $C_{SHS\_LCG}$) associatively connected with the switches in series, respectively. The switches and associated capacitors are used for the purpose of correlated double sampling (CDS) or digital double sampling (DDS), which is a method of measuring sensor outputs in order to remove an undesired offset. Details of the switches and the associated capacitors will be described in details later in the specification.

In the embodiment, both the large photodiode PD_L and the small photodiode PD_S have anti-blooming feature such that when the photodiode is saturated, blooming charge will be drained through its blooming path. For the large photodiode PD_L, the blooming charge is drained to the first FD node Cfd1, details of which may be referred to U.S. Pat. No. 9,653,513, filed on Apr. 8, 2016, and entitled CMOS Image Sensor and a Method of Forming the Same, assigned to the same assignee of the present application, the disclosure of which is incorporated herein by reference. For the small photodiode PD_S, the blooming charge is drained to the power voltage Vdd, details of which may be referred to U.S. Pat. No. 9,070,802, filed on Mar. 12, 2014, and entitled Image Sensor and Fabricating Method of Image Sensor, assigned to the same assignee of the present application, the disclosure of which is incorporated herein by reference.

Figure 2:
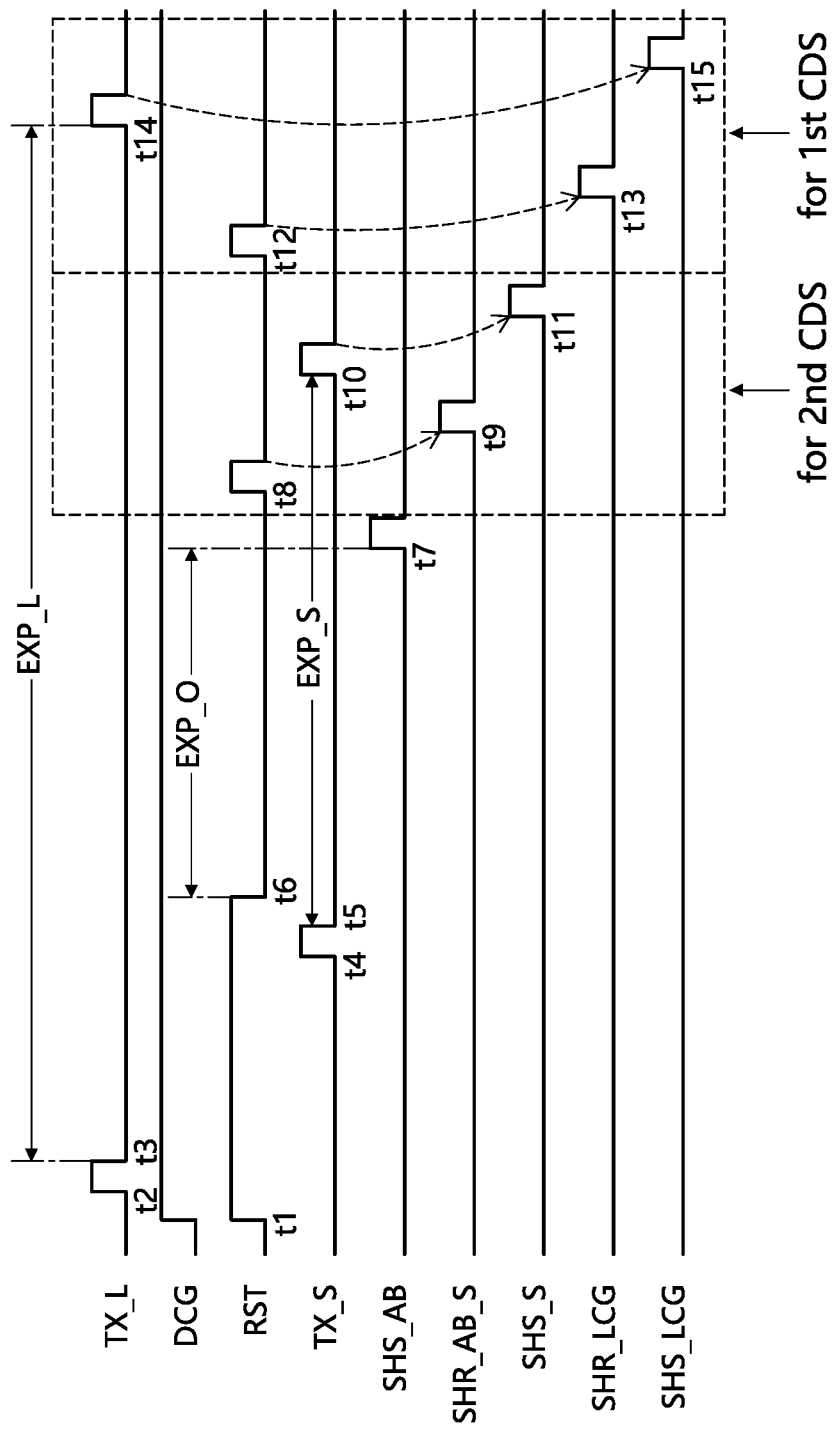
FIG. 2 shows an exemplary timing diagram illustrated of pertinent signals of the pixel circuit of FIG. 1.
Figure 3:
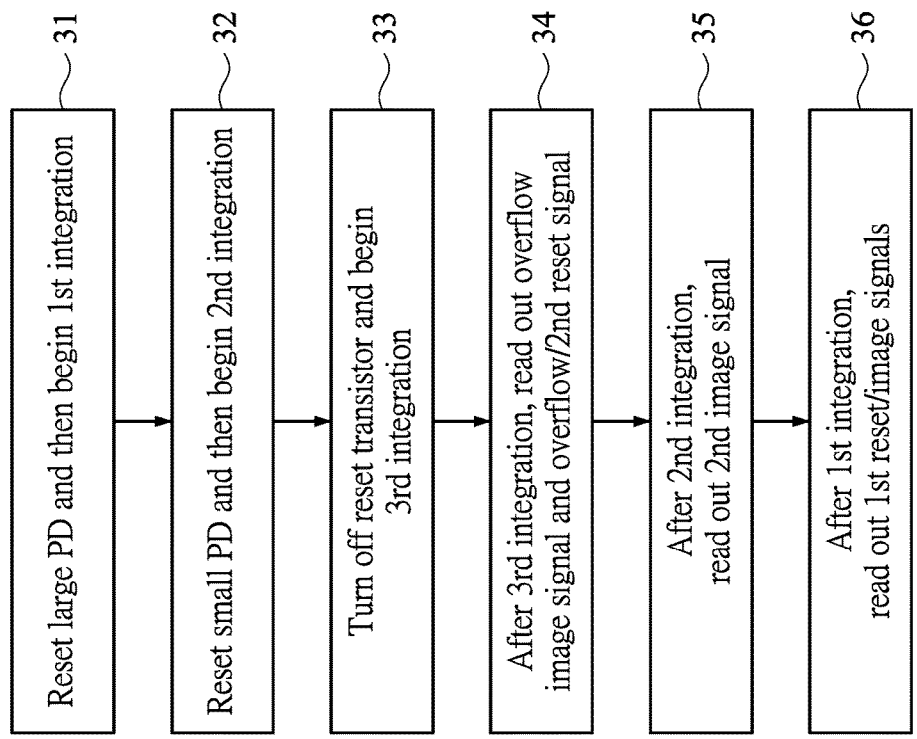
FIG. 3 shows a flow diagram illustrated of a method of operating an image sensor according to one embodiment of the present invention.

FIG. 2 shows an exemplary timing diagram illustrated of pertinent signals of the pixel circuit 100 of FIG. 1, and FIG. 3 shows a flow diagram illustrated of a method of operating an image sensor according to one embodiment of the present invention. It is noted that, as the connect transistor DCG is turned on throughout the operation, the first FD node Cfd1 for the large photodiode PD_L and the second FD node Cfd2 for the small photodiode PD_S are electrically connected at the same voltage, and are called the FD node in the specification.

In step 31, at time t1, the reset transistor RST is turned on. Subsequently, at time t2, the first transfer transistor TX_L for the large (or first) photodiode PD_L is turned on for a predetermined period (defined by a pulse signal) while the reset transistor RST is turned on, such that the large photodiode PD_L is reset with a power voltage Vdd. Upon turning off the first transfer transistor TX_L at time t3, first integration EXP_L for the large photodiode PD_L begins.

Next, in step 32, at time t4, the second transfer transistor TX_S for the small (or second) photodiode PD_S is turned on for a predetermined period (defined by a pulse signal) while the reset transistor RST is turned on, such that the small photodiode PD_S is reset with the power voltage Vdd. Upon turning off the second transfer transistor TX_S at time t5, second integration EXP_S for the small photodiode PD_S begins.

Afterwards, in step 33, the reset transistor RST is turned off at time t6, and third integration EXP_O begins during which blooming charge, if any, overflowing from the large photodiode PD_L is collected at the FD node Cfd1/Cfd2. In the embodiment, there are three integrations, among which the first integration EXP_L (by the large photodiode PD_L) has the longest integration time, and the third integration EXP_O (at the FD node Cfd1/Cfd2) has the shortest integration time.

In step 34, at the end (time t7) of the third integration EXP_O, an overflow image signal (collected at the FD node Cfd1/Cfd2) is read out and sampled by closing the switch $SW_{SHS\_AB}$ (for a predetermined period) and then is held in the capacitor $C_{SHS\_AB}$. Subsequently, at time t8, the reset transistor RST is turned on for a predetermined period to reset the FD node Cfd1/Cfd2. Next, at time t9, an overflow reset signal for the third integration EXP_O is read out and sampled by closing the switch $SW_{SHR\_AB\_S}$ (for a predetermined period) and then being held in the capacitor $C_{SHR\_AB\_S}$. It is noted that the overflow reset signal is also used as a second reset signal related to the small photodiode PD_S for the second integration EXP_S. The overflow image signal and the overflow reset signal may be optionally processed (e.g., by a signal processor) later for performing DDS.

In step 35, at the end (time t10) of the second integration EXP_S, the second transfer transistor TX_S is turned on for a predetermined period, such that a second image signal integrated by the small photodiode PD_S is transferred to the FD node Cfd1/Cfd2. Next, at time t11, the second image signal is read out and sampled by closing the switch $SW_{SHS\_S}$ (for a predetermined period) and then is held in the capacitor $C_{SHS\_S}$. The second image signal and the second reset signal (which is shared with the overflow reset signal) may be optionally processed (e.g., by a signal processor) later for performing (second) CDS.

In step 36, before the end of the first integration EXP_L, at time t12, the reset transistor RST is turned on for a predetermined period to reset the FD node Cfd1/Cfd2. Next, at time t13, the first reset signal is read out and sampled by closing the switch $SW_{SHR\_LCG}$ (for a predetermined period) and then is held in the capacitor $C_{SHR\_LCG}$. At the end (time t14) of the first integration EXP_L, the first transfer transistor TX_L is turned on for a predetermined period, such that a first image signal integrated by the large photodiode PD_L is transferred to the FD node Cfd1/Cfd2. Next, at time t15, the first image signal is read out and sampled by closing the switch $SW_{SHS\_LCG}$ (for a predetermined period) and then is held in the capacitor $C_{SHS\_LCG}$. The first image signal and the first reset signal may be optionally processed (e.g., by a signal processor) later for performing (first) CDS.

The first integration EXP_L, having the longest integration time and having the highest sensitivity because of larger photodiode area of the large photodiode PD_L, is responsible for a darker region of a given scene. For a brighter region of the scene, the large photodiode PD_L will be saturated, and signal level is thus lost. For this reason, the second integration EXP_S, having shorter integration time and having lower sensitivity because of smaller photodiode area of the small photodiode PD_S, is responsible for a brighter region of the scene. For the brightest region of the scene, the small photodiode PD_S will be saturated too. Therefore, the third integration EXP_O, having the shortest integration time and collecting the blooming charge overflowing from the large photodiode PD_L while blooming charge from the small photodiode PD_S is drained to Vdd, is responsible for the brightest region of the scene.

Figure 4:
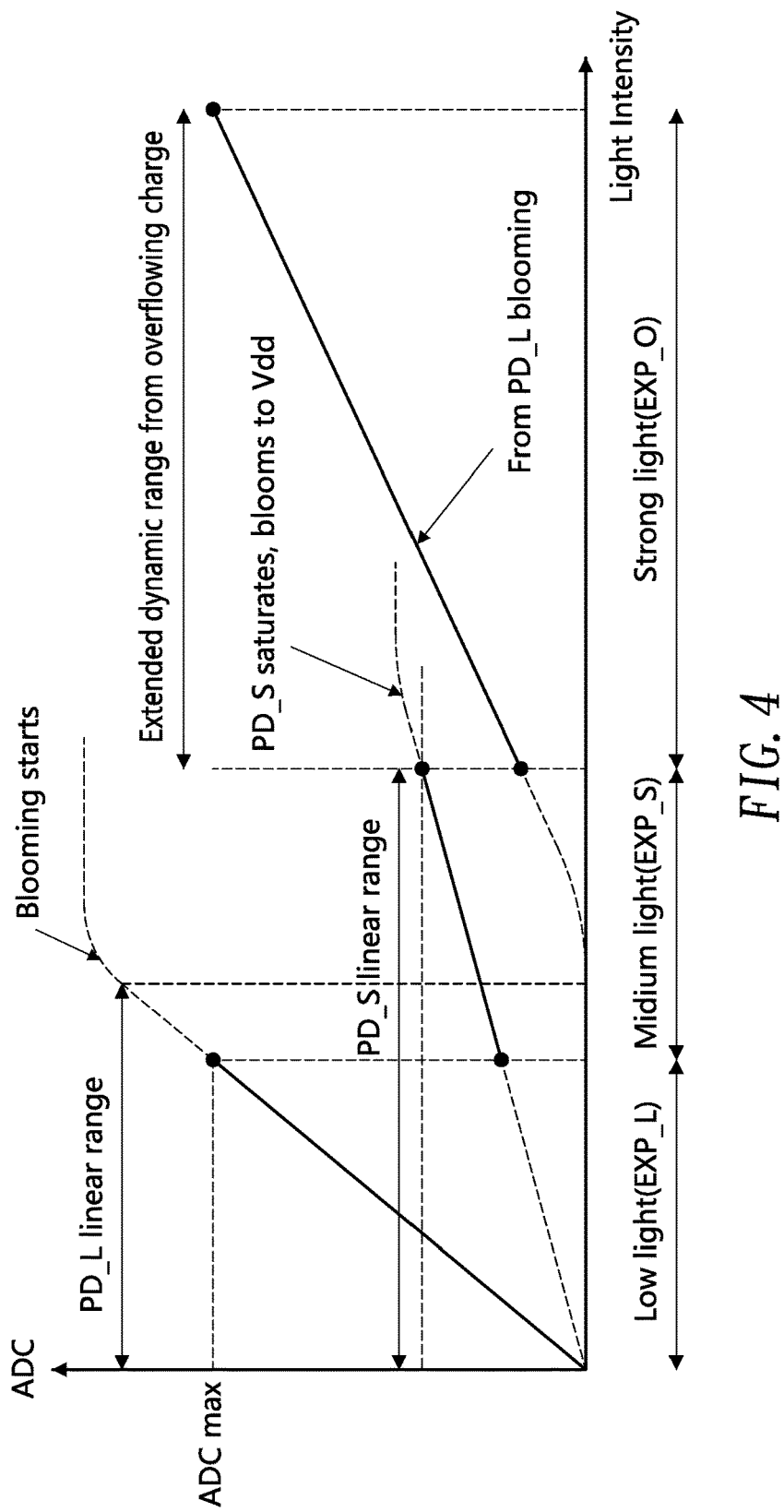
FIG. 4 shows exemplary curves illustrated of pixel output versus light input for the three exposure values EXP_L, EXP_S and EXP_O according to the first embodiment of the present invention.

FIG. 4 shows exemplary curves illustrated of pixel output versus light input for the three exposure values (or signals) EXP_L, EXP_S and EXP_O according to the first embodiment of the present invention. The slope of each linear curve is a function of integration time and photodiode size (or sensitivity). While the photodiode sizes are fixed once the image sensor is fabricated, the integration time, however, may be adjusted to achieve optimal ratio between the three exposure values EXP_L, EXP_S and EXP_O. Specifically, the slope of low light is highest because it has a larger photodiode area and longest integration time. The ratio of the slope of low light to medium light may be expressed as (sensitivity of PD_L/sensitivity of PD_S)×(EXP_L/EXP_S). The small photodiode PD_S saturates at lower ADC value due to its smaller size. The ratio of the slope of low light to strong light is (EXP_L/EXP_O), assuming that blooming charge is identical to the rate that charge is generated in the large photodiode PD_L before saturation. By combining the three exposure values EXP_L, EXP_S and EXP_O with high conversion gain, at least 120 dB dynamic range can be achieved to capture high contrast scenes without saturation.

The embodiment of the present invention may be adapted for light-emitting diode (LED) flicker mitigation. LED lights used in traffic signals and automotive brake lights are typically modulated at 90 Hz or above. When integration time of a particularly photodiode (either PD_L or PD_S) in a pixel is shorter than the ON duty cycle of the LED, the pixel will sometimes miss the LED signal, resulting in flickering of the LED. Therefore, the integration time for both the large photodiode PD_L and the small photodiode PD_S should be larger than the ON duty cycle of the LED. As the large photodiode PD_L is used for capturing the darker region of a scene, its long integration time is not the major concern for flickering. If the LED saturates the large photodiode PD_L, the output of the pixel will rely on the reading from the small photodiode PD_S.

The small photodiode PD_S is desensitized in the embodiment with its smaller photodiode size. Because it is used for brighter region, its integration time needs to be long enough to avoid flickering. Therefore, in another embodiment, the small photodiode PD_S may be further desensitized, for example, by removing microlens (ML) disposed above the small photodiode PD_S. The balancing act of integration time and sensitivity sets a limit to how bright a region it can detect before saturation. For a typical traffic scene for automobile application, the LED falls into the middle range light intensity, and flicker is thus mitigated. For stronger light intensity, the pixel readout will rely on the overflow charge at the FD node. Since all the three exposure values EXP_L, EXP_S and EXP_O overlap each other, as shown in FIG. 4, motion artifacts may thus be eliminated.

Figure 5:
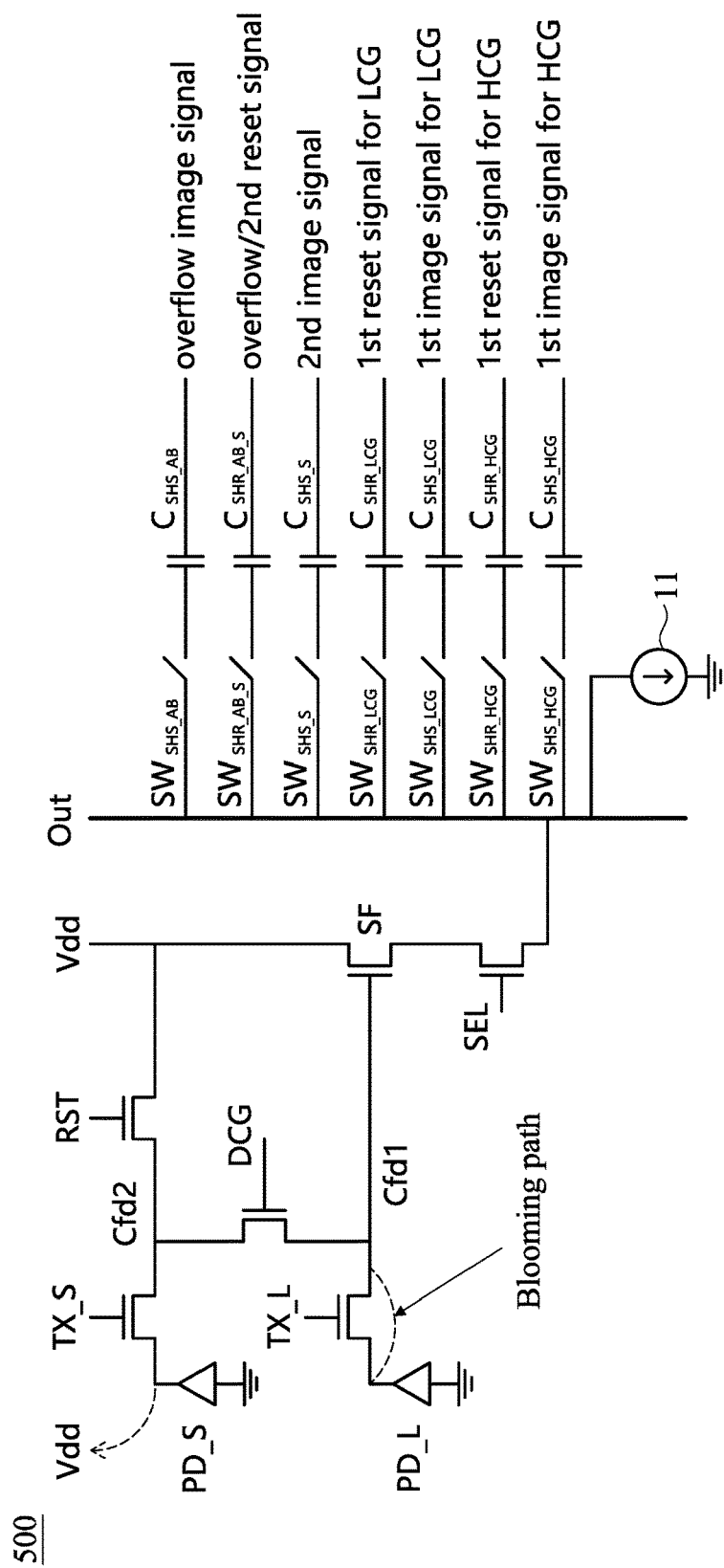
FIG. 5 shows a circuit diagram illustrated of a pixel circuit of an image sensor according to a second embodiment of the present invention.

FIG. 5 shows a circuit diagram illustrated of a pixel circuit 500 of an image sensor (e.g., a CMOS image sensor) according to a second embodiment of the present invention. The pixel circuit 500 of the embodiment is similar to the pixel circuit 100 (FIG. 1) with the exception that the switches (e.g., $SW_{SHS\_AB}$, $SW_{SHR\_AB\_S}$, $SW_{SHS\_S}$, $SW_{SHR\_LCG}$, $SW_{SHS\_LCG}$, $SW_{SHR\_HCG}$ and $SW_{SHS\_HCG}$) connected to the output node and the capacitors (e.g., $C_{SHS\_AB}$, $C_{SHR\_AB\_S}$, $C_{SHS\_S}$, $C_{SHR\_LCG}$, $C_{SHS\_LCG}$, $C_{SHR\_HCG}$ and $C_{SHS\_HCG}$) associatively and respectively connected with the switches in series are to an extent different from the pixel circuit 100. Details of the switches and the associated capacitors of the embodiment will be described in details later in the specification.

Figure 6:
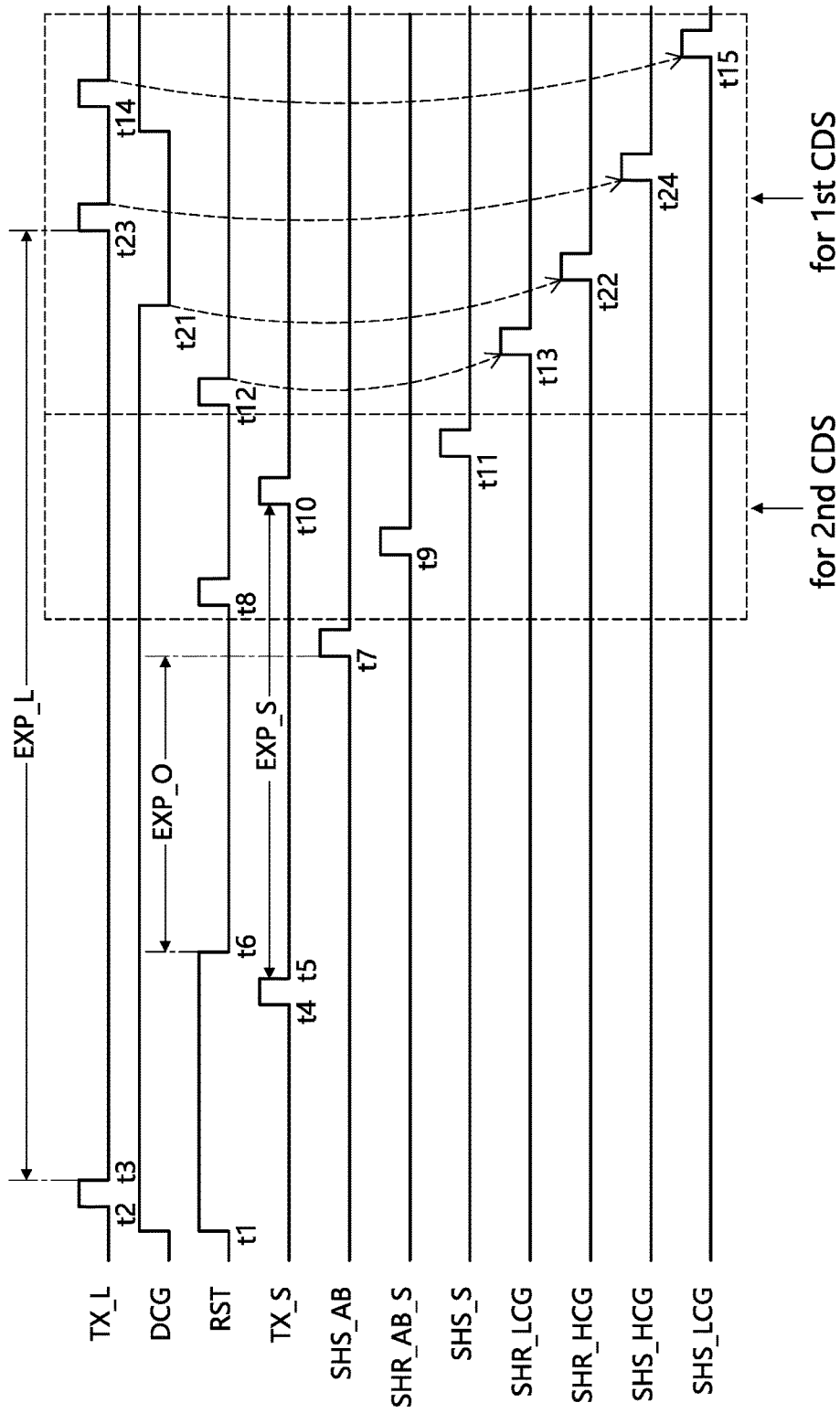
FIG. 6 shows an exemplary timing diagram illustrated of pertinent signals of the pixel circuit of FIG. 5.

FIG. 6 shows an exemplary timing diagram illustrated of pertinent signals of the pixel circuit 550 of FIG. 5. The flow diagram of FIG. 3 illustrated of a method of operating an image sensor may be adapted to the pixel circuit 500 of FIG. 5. In the second embodiment, steps 31-35 are performed in the same manner as the first embodiment, and their details are omitted for brevity. Only step 36 of the present embodiment is detailed as follows.

After the first reset signal is read out (at time t13) but before the first image signal is transferred to the FD node Cfd1/Cfd2 (at time t14), the connect transistor DCG is turned off at time t21 for a predetermined period, during which conversion gain will be increased (that is, high conversion gain or HCG), thus resulting in better noise performance in the low light situation. Other period in step 36 is referred to as low conversion gain or LCG. Conversion gain is measure as the change in output voltage with the absorption of one charge.

Specifically, at time t22, the first reset signal for HCG is read out and sampled by closing the switch $SW_{SHR\_HCG}$ (for a predetermined period) and then is held in the capacitor $C_{SHR\_HCG}$. At the end (time t23) of the first integration EXP_L, the first transfer transistor TX_L is turned on for a predetermined period, such that a first image signal for HCG integrated by the large photodiode PD_L is transferred to the FD node Cfd1/Cfd2. Next, at time t24, the first image signal for HCG is read out and sampled by closing the switch $SW_{SHS\_HCG}$ (for a predetermined period) and then is held in the capacitor $C_{SHS\_HCG}$. The first image signal for HCG and the first reset signal for HCG may be optionally processed later for performing CDS. It is noted that CDS of the first image & reset signals for HCG is preferably performed before CDS of the first image & reset signals for LCG.

Figure 7:
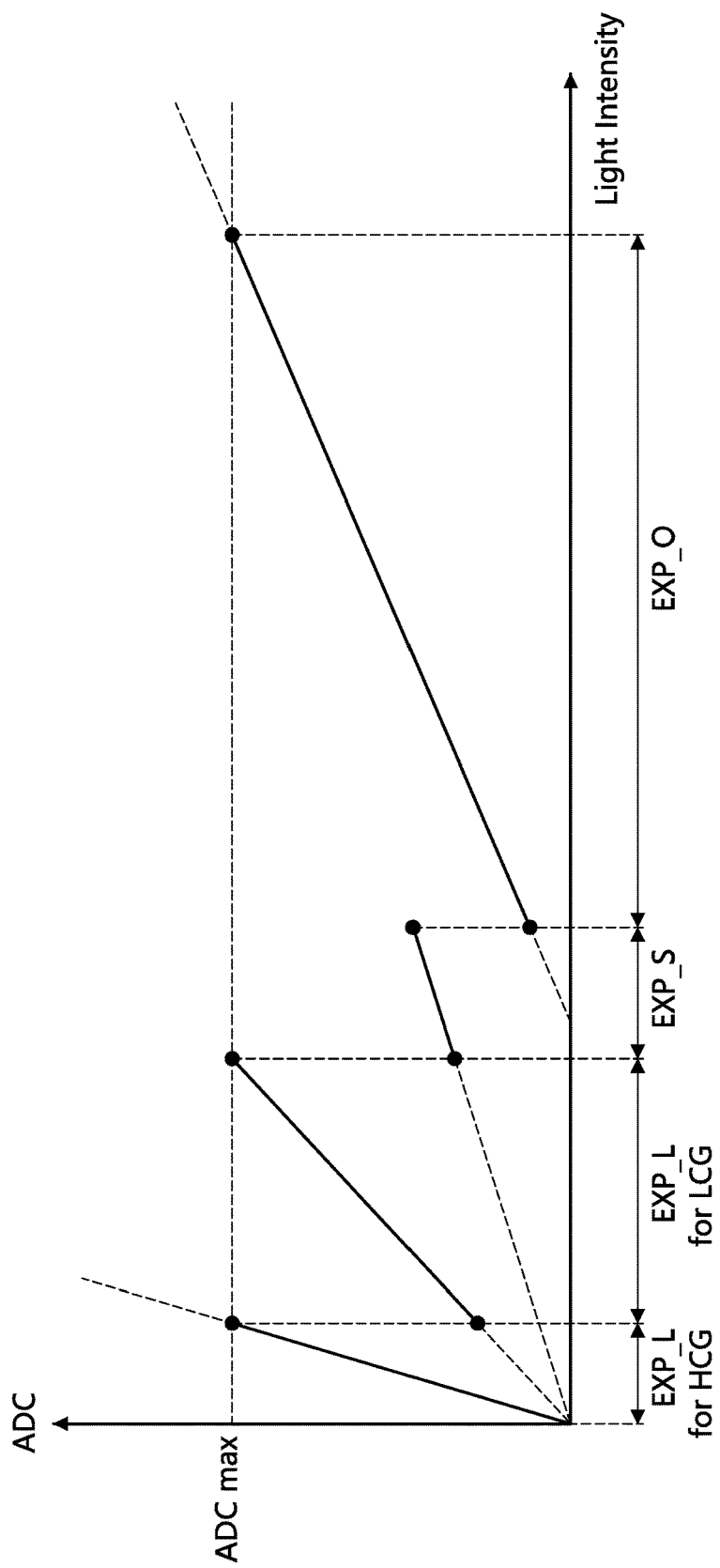
FIG. 7 shows exemplary curves illustrated of pixel output versus light input for the four exposure values EXP_L for HCG, EXP_L for LCG, EXP_S and EXP_O according to the second embodiment of the present invention.

FIG. 7 shows exemplary curves illustrated of pixel output versus light input for the exposure values EXP_L for HCG, EXP_L for LCG, EXP_S and EXP_O according to the second embodiment of the present invention. By combining the four exposure values EXP_L for HCG, EXP_L for LCG, EXP_S and EXP_O, high dynamic range can be achieved to capture high contrast scenes without saturation.

Although specific embodiments have been illustrated and described, it will be appreciated by those skilled in the art that various modifications may be made without departing from the scope of the present invention, which is intended to be limited solely by the appended claims.

What is claimed is:

1. A method of operating an image sensor, comprising:
performing a first integration on a first photodiode of a pixel circuit to obtain at least one first image signal;
performing a second integration on a second photodiode of the pixel circuit to obtain a second image signal, the first photodiode having a photodiode area larger than the second photodiode; and
performing a third integration by collecting blooming charge overflowing from the first photodiode to obtain an overflow image signal;
wherein the first integration has longest integration time and the third integration has shortest integration time among the first integration, the second integration and the third integration.

2. The method of claim 1, further comprising:
reading out an overflow reset signal for the third integration, the overflow reset signal being used as a second reset signal related to the second photodiode, the overflow reset signal and the overflow image signal being processed for performing digital double sampling (DDS), the second reset signal and the second image signal being processed for performing correlated double sampling (CDS); and
reading out at least one first reset signal related to the first photodiode, the at least one first reset signal and the at least one first image signal being processed for performing CDS.

3. The method of claim 1, wherein the at least one first image signal comprises a first image signal for low conversion gain (LCG) and a first image signal for high conversion gain (HCG) which is higher than the LCG.

4. The method of claim 1, wherein integration time of the first photodiode or the second photodiode is larger than a turn-on duty cycle of a light source to be captured by the image sensor.

5. A method of operating an image sensor, comprising:
resetting a first photodiode of a pixel circuit and then beginning a first integration on the first photodiode;
resetting a second photodiode of the pixel circuit and then beginning a second integration on the second photodiode, the first photodiode having a photodiode area larger than the second photodiode;
performing a third integration by collecting blooming charge overflowing from the first photodiode, the first integration has longest integration time and the third integration has shortest integration time among the first integration, the second integration and the third integration;
at an end of the third integration, reading out an overflow image signal;
reading out an overflow reset signal for the third integration, the overflow reset signal being used as a second reset signal related to the second photodiode;
reading out a second image signal related to the second photodiode after an end of the second integration; and
reading out at least one first reset signal related to the first photodiode before an end of the first integration, and then reading out at least one first image signal related to the first photodiode after an end of the first integration.

6. The method of claim 5, wherein integration time of the first photodiode or the second photodiode is larger than a turn-on duty cycle of a light source to be captured by the image sensor.

7. The method of claim 5, wherein the first integration begins upon turning off a first transfer transistor associated with the first photodiode.

8. The method of claim 5, wherein the second integration begins upon turning off a second transfer transistor associated with the second photodiode.

9. The method of claim 5, wherein the third integration begins upon turning off a reset transistor of the pixel circuit.

10. The method of claim 5, wherein the overflow image signal is sampled and held.

11. The method of claim 5, wherein the overflow reset signal is read out after turning on a reset transistor of the pixel circuit for a predetermined period to reset a floating diffusion node, followed by sampling and holding the readout overflow reset signal; and the second image signal is read out after turning on a second transfer transistor associated with the second photodiode for a predetermined period, followed by sampling and holding the readout second image signal.

12. The method of claim 5, wherein the first reset signal is read out after turning on a reset transistor of the pixel circuit for a predetermined period to reset a floating diffusion node, followed by sampling and holding the readout first reset signal; and the first image signal is read out after turning on a first transfer transistor associated with the first photodiode for a predetermined period, followed by sampling and holding the readout first image signal.

13. The method of claim 5, wherein the at least one first reset signal comprises a first reset signal for low conversion gain (LCG) and a first reset signal for high conversion gain (HCG) which is higher than the LCG; and the at least one first image signal comprises a first image signal for LCG and a first image signal for HCG.

14. The method of claim 13, wherein the step of reading out the at least one first reset signal and the at least one first image signal comprises:
turning on a reset transistor for a predetermined period, followed by reading out the first reset signal;
turning off a connect transistor connected between floating diffusion nodes of the first photodiode and the second photodiode, followed by reading out the first reset signal for HCG;
turning on a first transfer transistor associated with the first photodiode for a predetermined period, followed by reading out the first image signal for HCG; and
turning on the connect transistor and turning on the first transfer transistor for a predetermined period, followed by reading out the first image signal for LCG.

15. An image sensor, comprising:

a plurality of pixel circuits each comprising:

a first photodiode and a second photodiode, the first photodiode having a photodiode area larger than the second photodiode;

a first transfer transistor connected between the first photodiode and a first floating diffusion (FD) node;

a second transfer transistor connected between the second photodiode and a second FD node;

a connect transistor connected between the first FD node and the second FD node;

a reset transistor connected between a power voltage and the second FD node; and a source follower and a select transistor connected in series between the power voltage and an output node, the source follower being connected between the power voltage and the select transistor and a gate of the source follower being connected to the first FD node, the select transistor being connected between the source follower and the output node;

wherein a first integration is performed on the first photodiode to obtain at least one first image signal; a second integration is performed on the second photodiode to obtain a second image signal; and a third integration is performed by collecting blooming charge overflowing from the first photodiode to obtain an overflow image signal;

wherein the first integration has longest integration time and the third integration has shortest integration time among the first integration, the second integration and the third integration.

16. The image sensor of claim 15, wherein the pixel circuit further comprises a current source coupled between the output node and ground.

17. The image sensor of claim 15, wherein the pixel circuit further comprises a plurality of switches connected to the output node respectively, and a plurality of capacitors associatively connected with the switches in series, respectively.

18. The image sensor of claim 15, wherein the blooming charge flows to the first FD node.

19. The image sensor of claim 15, wherein the at least one first image signal comprises a first image signal for low conversion gain (LCG) and a first image signal for high conversion gain (HCG) which is higher than the LCG.

20. The image sensor of claim 15, wherein integration time of the first photodiode or the second photodiode is larger than a turn-on duty cycle of a light source to be captured by the image sensor.

* * * * *